F. A. SCHLUNS.
LOCKING DEVICE FOR ROTATIVE PARTS.
APPLICATION FILED FEB. 2, 1909.
956,605.
Patented May 3, 1910.
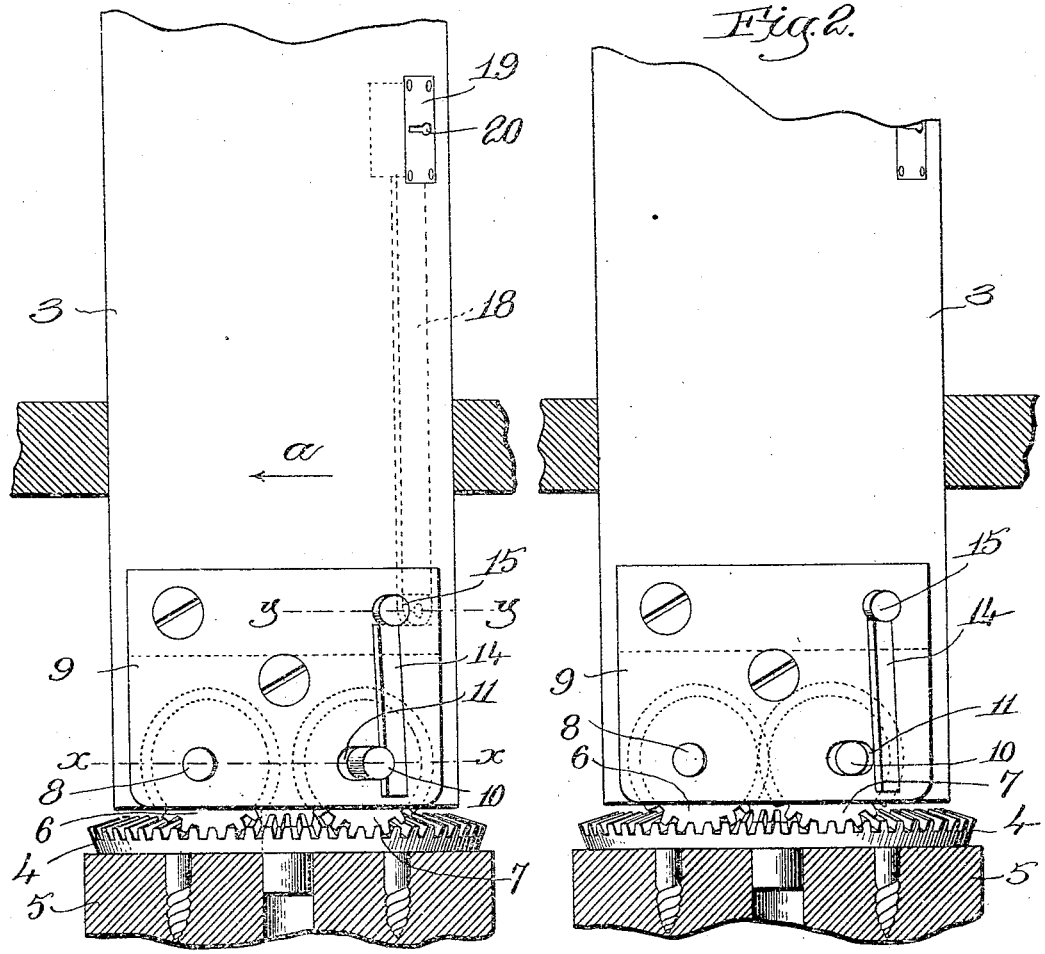
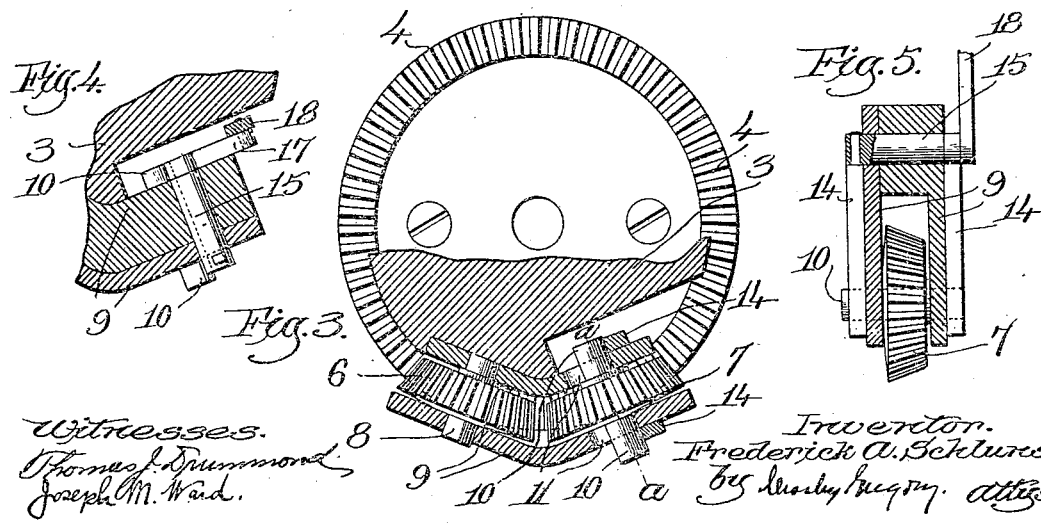
Witnesses.
Thomas J. Drummond
Joseph M. Ward
Inventor.
Frederick A. Schluns.
by Crosby Gregory Attys.

UNITED STATES PATENT OFFICE.

FREDERICK A. SCHLUNS, OF REVERE, MASSACHUSETTS.

LOCKING DEVICE FOR ROTATIVE PARTS.

956,605. Specification of Letters Patent. Patented May 3, 1910.

Application filed February 2, 1909. Serial No. 475,550.

*To all whom it may concern:*

Be it known that I, FREDERICK A. SCHLUNS, a citizen of the United States, residing at Revere, county of Suffolk, and State of Massachusetts, have invented an Improvement in Locking Devices for Rotative Parts, of which the following description, in connection with the accompanying drawing, is a specification, like numerals on the drawing representing like parts.

This invention has for its object the production of a novel device which will permit a part to rotate freely in one direction, but will lock it automatically from rotating in a reverse direction.

The invention is capable of use in a great variety of ways but is particularly applicable to turnstiles, revolving doors, etc., and in the drawings I have shown it as it might be employed in connection with a turnstile. I wish it distinctly understood, however, that the invention can equally well be used in connection with rotative parts of other mechanisms where it is desired to permit the rotation of an element in one direction but to prevent said element from rotating in the opposite direction, or to lock it from rotation in either direction.

Referring to the drawings wherein I have shown an embodiment of my invention, Figure 1 is a side view of a rotatable element in the form of a post with which my invention is employed, said view showing the locking device in the position it assumes while permitting the free rotation of the post in one direction; Fig. 2 is a similar view showing the locking device in position to prevent the backward rotation of the post; Fig. 3 is a partial section on the line *x—x*, Fig. 1; Fig. 4 is a section on the line *y—y*, Fig. 1; Fig. 5 is a section on the line *a—a*, Fig. 3.

The rotative element is herein shown at 3 and is in the form of a post which may be the post of a turnstile. The locking device which prevents backward rotation of the post is in the form of a toothed member 4 which is fixedly secured to a suitable foundation 5 and with which is adapted to mesh two gears or toothed members 6 and 7 carried by the rotative member 3. I have herein shown said toothed members as in the form of bevel gears, but this is not essential to the invention. The gear 6 is supported on the post to rotate about an axis fixed with relation to the post, while the bevel gear 7 is mounted to move toward and from the gear 6 so as to permit the two gears to be carried either into or out of mesh with each other. I have herein shown the gear 6 as provided with journals 8 that are mounted in the bearing plates 9 carried by the rotative element 3. The gear 7 is also provided with journals 10 that are mounted in slots 11 formed in said bearing plates 9. These slots 11 are of such a length that when the journals 10 are at one end of the slots, as shown in Figs. 1 and 3, said gears 7 and 6 are out of mesh with each other, but when the journals are at the opposite end of the slots, said gears are brought into mesh with each other. The gears 6 and 7 are always in mesh with the fixed gear 4. When the post 3 rotates in the direction of the arrow *a*, Fig. 1, the friction between the gear 7 and the gear 4 carries said gear 7 away from and out of mesh with the gear 6, as shown in Figs. 1 and 3. When the parts are in this position the post can be rotated freely in the direction of the arrow, and during such rotation the gears 6 and 7 merely roll over the gear 4. If an attempt is made to turn the post in the opposite direction, the friction between the gear 4 and the gear 7 will carry said gear 7 into the position shown in Fig. 2 and into mesh with the gear 6, thus locking the rotative element 3 from rotation, for it will be observed that as long as the gear 7 is in mesh with both the gears 6 and 4 said gear 7 will lock the gear 6 and consequently the element 3 from rotation.

The invention is very simple in construction and may be applied to rotative parts of all sorts of shapes as will be evident to those skilled in the art.

The principal feature of my invention consists in the employment of two gears, such as 6 and 7, one of which is mounted to have movement toward and from the other and both of which mesh with another gear so that when the rotative element moves in one direction, the gears are separated thereby permitting free rotation of said part, while when said element tends to rotate in the opposite direction the gears are brought together, thereby locking the part from rotation. I have also associated with my device means to lock the post from rotating in either direction. This is accomplished by a device which forces the gear 7 into mesh with the gear 6 and holds it in mesh therewith, for it will be observed that so long as the gears 6 and 7 are in mesh the post 3 cannot rotate in either direction. This device is herein shown as a rock shaft 15 journaled in the bearing plates 9 and having two arms 14 which engage the journals 10 of the gear 7, and another arm 17 which has connected thereto a rod or bar 18 that extends longitudinally of the post 3 and by which the rock shaft may be operated. This bar may form part of a suitable lock 19 and may be operated by a key inserted in the key hole 20 of the lock in a manner similar to that in which the bolt of an ordinary door lock is operated, or the bar 18 may be operated in any other suitable way. By throwing the bar 18 downwardly the rock-shaft 15 is turned thereby to positively force the gear 7 into engagement with the gear 6, and so long as this condition is maintained the post 3 will be held from rotation.

It will be obvious that other changes may be made in the constructional details without departing from the invention.

Having fully described my invention, what I claim as new and desire to secure by Letters Patent is:—

1. In a device of the class described, the combination with a fixed beveled gear, of a rotative element mounted to rotate about the axis of said gear, two beveled gears carried by the rotative element and both constantly meshing with the fixed gear, one of said latter gears being movable in its bearing toward and from the other gear whereby when the rotative element revolves in one direction said gears are disconnected while when the rotative element is turned in the opposite direction, said gears are brought into mesh thereby to lock said element from rotation.

2. In a device of the class described, the combination with a fixed gear, of a rotative element mounted to rotate about the axis of said gear, two gears carried by the rotative element and both meshing with the fixed gear, one of said latter gears being movable into and out of mesh with the other gear, and means to control the movement of the movable gear.

In testimony whereof, I have signed my name to this specification, in the presence of two subscribing witnesses.

FREDERICK A. SCHLUNS.

Witnesses:
Louis C. Smith,
Thomas J. Drummond.